United States Patent
Kaluzhny

(10) Patent No.: US 10,133,554 B2
(45) Date of Patent: Nov. 20, 2018

(54) NON-MODULAR MULTIPLIER, METHOD FOR NON-MODULAR MULTIPLICATION AND COMPUTATIONAL DEVICE

(71) Applicant: Winbond Electronics Corp., Taichung (TW)

(72) Inventor: Uri Kaluzhny, Taichung (TW)

(73) Assignee: Winbond Electronics Corp., Taichung (TW)

( * ) Notice: Subject to any disclaimer, the term of this patent is extended or adjusted under 35 U.S.C. 154(b) by 7 days.

(21) Appl. No.: 15/452,744

(22) Filed: Mar. 8, 2017

(65) Prior Publication Data

US 2017/0286063 A1 Oct. 5, 2017

(30) Foreign Application Priority Data

Mar. 30, 2016 (IL) .......................... 244842

(51) Int. Cl.
*G06F 7/523* (2006.01)
*G06F 7/72* (2006.01)
*G06F 7/58* (2006.01)

(52) U.S. Cl.
CPC .............. *G06F 7/523* (2013.01); *G06F 7/588* (2013.01); *G06F 7/722* (2013.01); *G06F 7/729* (2013.01)

(58) Field of Classification Search
CPC .................................. G06F 7/523; G06F 7/53
See application file for complete search history.

(56) References Cited

U.S. PATENT DOCUMENTS

| | | |
|---|---|---|
| 2004/0059767 A1 | 3/2004 | Liardet |
| 2013/0262544 A1* | 10/2013 | Lee ................. G06F 7/533 708/250 |
| 2016/0277184 A1* | 9/2016 | Katayama ........... H04L 9/002 |

OTHER PUBLICATIONS

Jean-Claude Bajard et al., "Leak Resistant Arithmetic," Cryptographic Hardware and Embedded Systems—CHES 2004, Jul. 2004, pp. 62-75.

Ambrose Jude Angelo et al., "Randomised multi-modulo residue number system architecture for double-and-add to prevent power analysis side channel attacks," IET Circuits, Devices & Systems, Institution of Engineering and Technology, vol. 7, No. 5, Sep. 2013, pp. 283-293.

(Continued)

*Primary Examiner* — Chuong D Ngo
(74) *Attorney, Agent, or Firm* — JCIPRNET

(57) ABSTRACT

A non-modular multiplier, a method for non-modular multiplication and a computational device are provided. The non-modular multiplier includes an interface and circuitry. The interface is configured to receive n-bit integers A and B. The circuitry is configured to calculate a non-modular product (A*B) by performing a sequence of computations, and to randomize a pattern of an electrical power consumed by the multiplier when performing the sequence. The sequence includes: generating a random number w, determining moduli M1 and M2 that depend on a number $R=2^k$, k equals a bit-length of M1 and M2, and on the random number w, and calculating a first modular product C=A*B % M1 and a second modular product D=A*B % M2, and producing and outputting the non-modular product (A*B) based on the first and second modular products.

12 Claims, 2 Drawing Sheets

(56) References Cited

OTHER PUBLICATIONS

"Search Report of Europe Counterpart Application", dated Aug. 16, 2017, p. 1-p. 8.
Menezes et al., "Modular addition and subtraction", Handbook of Applied Cryptography, Oct. 1996, 600~603.
Amiel et al., "Power Analysis for Secret Recovering and Reverse Engineering of Public Key Algorithms", Proceedings of the 14th international conference on Selected areas in cryptography, Aug. 2007, 110~125.
Mearie Journal, "Residue number system", Jan. 1, 2009, Available at: http://mearie.org/journal/2009/01/residue-number-system.ko.
Alan Daly et al., "Efficient architectures for implementing montgomery modular multiplication and RSA modular exponentiation on reconfigurable logic", FPGA '02, Feb. 2002, pp. 1-10.
"Office Action of Korea Counterpart Application", with English translation thereof, dated Apr. 12, 2018, p. 1-p. 8.

\* cited by examiner

NON-MODULAR MULTIPLIER, METHOD FOR NON-MODULAR MULTIPLICATION AND COMPUTATIONAL DEVICE

CROSS-REFERENCE TO RELATED APPLICATION

This application claims the priority benefit of Israel application serial no. 244842, filed on Mar. 30, 2016. The entirety of the above-mentioned patent application is hereby incorporated by reference herein and made a part of this specification.

FIELD OF THE INVENTION

The present invention relates generally to data security, and particularly to efficient non-modular multiplication that is protected against side-channel attacks.

BACKGROUND OF THE INVENTION

Many important cryptosystems, such as RSA, use modular as well as non-modular arithmetic, including exponentiation and multiplication, with large modulus values. The classical method of calculating a non-modular product involves partitioning the operands into blocks or "digits" and applying a weighted sum over cross-products of the digits. This naïve multiplication approach, however, is computationally expensive in many practical cases.

For modular multiplication, e.g., in cryptographic computations, it is common practice to use an efficient method, known as Montgomery modular multiplication (or simply Montgomery multiplication). To perform Montgomery multiplication, the operands are converted to a special Montgomery form using an algorithm known as Montgomery reduction. Multiplication of the operands in Montgomery form avoids the need for modular reduction as required in conventional arithmetic (although a simpler conditional reduction is still required if the resulting product is greater than the modulus). The Montgomery reduction and multiplication algorithms are described, for example, by Menezes et al., in the Handbook of Applied Cryptography (1996), section 14.3.2, pages 600-603, whose disclosure is incorporated herein by reference.

Cryptosystems may be subject to various types of attacks aimed to expose internal secret information. In an attack referred to as a side-channel attack (SCA) secret information can be deduced by analyzing the power consumption behavior during execution of an underlying cryptographic function. For example, Amiel et al., describe in an article entitled "Power Analysis for Secret Recovering and Reverse Engineering of Public Key Algorithms," proceedings of the 14$^{th}$ international conference on selected areas in cryptography, SAC 2007, LNCS, volume 4876, pages 110-125, Springer, Heidelberg, whose disclosure is incorporated herein by reference, differential power analysis (DPA) attacks, applied to non-modular multiplication computations.

SUMMARY OF THE INVENTION

An embodiment that is described herein provides a multiplier that includes an interface and circuitry. The interface is configured to receive n-bit integers A and B. The circuitry is configured to calculate a non-modular product (A*B) by performing a sequence of computations, and to randomize a pattern of an electrical power consumed by the multiplier when performing the sequence, the sequence including: generating a random number w, determining moduli M1 and M2 that depend on a number $R=2^k$, k equals a bit-length of M1 and M2, and on the random number w, and calculating a first modular product C=A*B % M1 and a second modular product D=A*B % M2, and, producing and outputting the non-modular product (A*B) based on the first and second modular products.

In some embodiments, the circuitry includes a Montgomery multiplier, which is configured to calculate the first and second modular products. In other embodiments, the circuitry is configured to convert A to A' in the modulus M1 of Montgomery domain by calculating w*A, to convert B to B' in the modulus M2 of Montgomery domain by calculating (w−d)*B, d being an integer smaller than w, and to calculate the first and second modular products by calculating respective Montgomery products A'⊙B and A⊙B' using the Montgomery multiplier. In yet other embodiments, (A*B) is represented as a combination of a low part $AB_L$ and a high part $AB_H$ satisfying $(A*B)=AB_H*R+AB_L$, and the circuitry is configured to calculate $AB_H$ and $AB_L$ based on the first and second modular products.

In an embodiment, the circuitry is configured to calculate the high part as $AB_H=(C−D)/d$, d being an integer used in converting B to Montgomery domain, and to calculate the low part as $AB_L=C−w*AB_H$. In another embodiment, the circuitry is configured to determine modulus M1 as M1=R−w, and to determine modulus M2 as M2=R−(w−d), d being an integer smaller than w.

There is additionally provided, in accordance with an embodiment that is described herein a method for non-modular multiplication, including receiving n-bit integers A and B. A non-modular product (A*B) is calculated, using a multiplier, by performing a sequence of computations, and randomizing a pattern of an electrical power consumed by the multiplier when performing the sequence, the sequence including: generating a random number w, determining moduli M1 and M2 that depend on a number $R=2^k$, k equals a bit-length of M1 and M2, and on the random number w, and calculating a first modular product C=A*B % M1 and a second modular product D=A*B % M2, and, producing and outputting the non-modular product (A*B) based on the first and second modular products.

There is additionally provided, in accordance with an embodiment that is described herein a computational device, including an interface and a multiplier. The interface is configured to receive n-bit integers A and B. The multiplier is configured to calculate a non-modular product (A*B) by performing a sequence of computations, and randomizing a pattern of an electrical power consumed by the multiplier when performing the sequence, the sequence including: generating a random number w, determining moduli M1 and M2 that depend on a number R=2 k, k equals a bit-length of M1 and M2, and on the random number w, and calculating a first modular product C=A*B % M1 and a second modular product D=A*B % M2, and, producing and outputting the non-modular product (A*B) based on the first and second modular products.

The present invention will be more fully understood from the following detailed description of the embodiments thereof, taken together with the drawings in which:

DETAILED DESCRIPTION OF EMBODIMENTS

Overview

Embodiments that are described herein provide methods for efficient non-modular multiplication based on Montgomery modular multiplications. The methods include modular computations with randomized moduli, which protect the computation against side-channel attacks.

Montgomery modular multiplication, also referred to simply as Montgomery multiplication for brevity, is a method for efficient multiplication. To summarize briefly, given two large integers A and B, instead of calculating A*B, Montgomery multiplication (denoted $\odot$) produces $A \odot B = A*B*R^{-1} \% M$, wherein $R=2^k$, and k is the bit-length of the modulus M. (The symbol "%" is used in the present description and in the figures to denote "modulo" and the symbol "*" or "·" is used to denote non-modular multiplication.)

In the disclosed embodiments, Montgomery multiplication is used to efficiently calculate expressions of the form A*B % M. To this end, only one of the operands is converted to Montgomery domain and multiplied with the other operand as follows:

$$A' \odot B = A*R*B*R^{-1} \% M = A*B \% M. \qquad \text{Equation 1:}$$

In some embodiments, a non-modular multiplier calculates two modular products in the form of Equation 1, for two different moduli M1 and M2, and combines the two modular products to derive the non-modular product $-(A*B)$. The non-modular product is represented using high and low parts as $AB_H*R+AB_L$, wherein the high and low parts are evaluated based on the modular products A*B % M1 and A*B % M2. The low and high parts can be viewed as respective low-significance and high-significance subsets of the 2 n-bit product (A*B).

The moduli M1 and M2 are determined based on $R=2^k$, and on a small odd integer w chosen at random. As will be described in detail below, calculating the modular products is simplified considerably by selecting k (and therefore R) sufficiently large. The random component w in the moduli M1 and M2 makes the computation protected against side-channel attacks. More specifically, under certain conditions on w, the proposed schemes result in the correct non-modular multiplication outcome independently of the specific w selected, but since for different values of w the computation comprises different calculations, the underlying power consumption pattern will be different as well, which protects the computation against power analysis attacks.

In the context of the present disclosure and in the claims, a power consumption pattern can be derived by analyzing a suitable parameter such as power or current consumed during computation.

System Description

Figure 1:
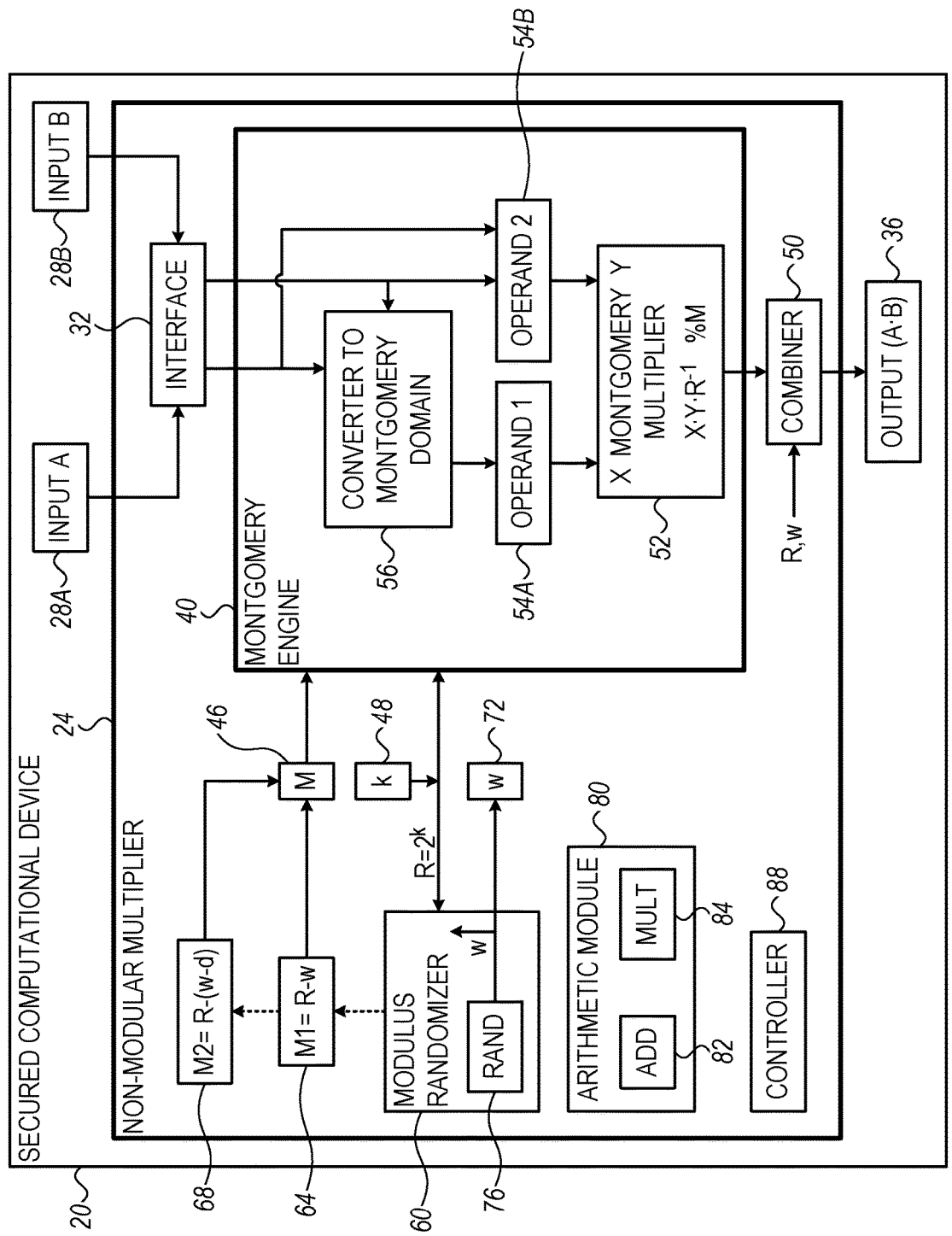
FIG. 1 is a block diagram that schematically illustrates a computational device having an efficient non-modular multiplier that is protected against side-channel attacks, in accordance with an embodiment that is described herein.

FIG. 1 is a block diagram that schematically illustrates circuit elements in a computational device 20 including an efficient non-modular multiplier that is protected against side-channel attacks, in accordance with an embodiment that is described herein. The circuit elements shown in the figure are typically implemented as hardware logic circuits in an integrated circuit (IC) device, such as in an Application-Specific Integrated Circuit (ASIC) or Field-Programmable Gate Array (FPGA), but may alternatively be implemented in software on a suitable programmable processor, or as a combination of hardware and software elements.

The pictured circuits carry out a non-modular multiplication function that may be integrated into the computational device in a wide variety of different configurations and applications, to perform operations connected with encryption, decryption, and/or authentication, for example. Only the elements of device 20 that are directly relevant to non-modular multiplication are shown in the figure, and the integration of these elements with other components of device 20 will be apparent to those skilled in the art.

Device 20 draws electrical power from a power source, e.g., a power supply or battery (not shown). The techniques described below protect device 20 from side-channel attacks that attempt to access secret information by analyzing the temporal or spectral pattern of the power consumed by device 20. Such an attack may sense the power consumption in various manners, e.g., by sensing the current on the power-supply lines feeding device 20, or by measuring electromagnetic radiation in the vicinity of the device.

Computational device 20 has a pair of inputs 28A, 28B (implemented as locations in a memory array, for example) to receive n-bit inputs A and B. Device 20 comprises a non-modular multiplier 24, which accepts A and B via an interface 32, and outputs the non-modular product (A*B) to an output 36 (such as another location in the memory array), whose contents may be delivered to other components of device 20 or fed back to one or both of inputs 28A, 28B for subsequent computations, such as multiple, successive multiplications that are used in exponentiation.

Non-modular multiplier 24 comprises a Montgomery engine 40, which is configured with a modulus parameter M 46 and an integer k 48, wherein k equals the bit-length of M, to be used in Montgomery arithmetic as will be described below. Integer k determines the value of R as $R=2^k$.

Montgomery engine 40 receives inputs A and B from interface 32, and calculates A*B % M. (The symbol "%" is used in the present description and in the figures to denote "modulo" and the symbol "*" or "·" is used to denote non-modular multiplication.) To carry out the non-modular multiplication between A and B, device 20 applies Montgomery engine 40 for A and B with two different moduli denoted M1 and M2, and delivers the modular products A*B % M1 and A*B % M2 to a combiner 50. As will be described in detail below, combiner 50 applies further computations on the modular products to derive the non-modular product (A*B).

Montgomery engine 40 comprises a Montgomery multiplier 52, which accepts k-bit operands 54A and 54B. Assuming the inputs to Montgomery multiplier 54 are denoted X and Y, the Montgomery multiplier performs the calculation:

$$X \odot Y = X*Y*R^{-1} \% M \qquad \text{Equation 2:}$$

Montgomery engine 40 further comprises a converter 56, which receives modulus M 46. Converter 56 receives an n-bit input X (i.e., A or B) and converts it to Montgomery domain X' given by:

$$X' = X*R \% M \qquad \text{Equation 3:}$$

X' has the same bit-length as M, i.e., k bits. As will be described below, by selecting M=(R−w), the computation in Equation 3 is equivalent to calculating X'=w*X, which requires no modular calculations and is therefore considerably simpler.

Montgomery multiplier 24 applies engine 40 separately for moduli M1 and M2. The operations described below can be carried out in various scheduling schemes. In an example embodiment, when configured to modulus M1, Montgomery engine 40 delivers input B to operand 54B, applies converter 56 to input A, and delivers A'=A*R % M1 to operand 54A. The Montgomery multiplier output in this case is given by:

$$A'\odot B = A*R*B*R^{-1} \% M1 = A*B \% 1M \qquad \text{Equation 4:}$$

When configured to modulus M2, Montgomery engine 40 delivers input A to operand 54B, applies converter 56 to input B, and delivers B'=B*R % M2 to operand 54A. The Montgomery multiplier output in this case is given by:

$$B'\odot A = B*R*A*R^{-1} \% 2M = A*B \% 2M \qquad \text{Equation 5:}$$

In Equations 4 and 5, the 2 n-bit value (A*B) is reduced to k-bit modular products with modulus M1 and M2, respectively. As will be described in detail below, combiner 50 recovers the non-modular 2 n-bit value (A*B) from the two modular products of Equations 4 and 5.

As described earlier, modulus parameter M 46 is configured to one of moduli M1 and M2. Non-modular multiplier 24 comprises a modulus randomizer 60 that calculates a modulus M1 64 and a modulus M2 68 as follows:

$$M1 = R - w$$

$$M2 = R - (w-d) \qquad \text{Equation 6:}$$

wherein d is a suitable integer, e.g., d=2 or d is some power of 2, and a number w 72 is a random or a pseudo-random integer chosen by a random generator 76. (The term "random," as used in the present description and in the claims, should be understood as including "pseudo-random" numbers, as well, unless the context indicates otherwise.) In the present disclosure, w is chosen as a random odd integer greater than d.

The number w is selected to be odd because Montgomery multiplication requires odd Moduli. In addition, w is chosen sufficiently small, so that converter 56 can calculate w*A and (w−d)*B fast and efficiently. The range of w is sufficiently large for achieving effective randomization in M1 and M2. In an example embodiment, w comprises a 32-bit random number.

Note that the outcome in calculating the non-modular product (A*B) using Montgomery engine 40 and combiner 50 is independent on the value of random w 72 (under certain conditions on w,) although the actual underlying calculations do depend on w. In other words, applying the scheme to same inputs A and B with pairs of moduli M1 and M2 derived from different numbers w1 and w2 results in the same non-modular outcome (A*B). The arithmetic operations carried out, however, in calculating (A*B) with w1 are different from those carried out with w2, which results in different respective power consumption patterns.

Non-modular multiplier 24 comprises an arithmetic module 80 that comprises an adder 82 and a non-modular multiplier 84. The adder and multiplier typically operate on blocks of a predefined size, such as thirty-two bits. Arithmetic module 80 applies non-modular arithmetic calculations for multiplier 24 as required by its various elements, such as Montgomery multiplier 52, converter 56, combiner 50 and modulus randomizer 60.

A controller 88 schedules and coordinates the operations of the different elements of multiplier 24 for in carrying out the non-modular multiplication.

Efficient Non-Modular Multiplication Based on Montgomery Multiplications

Figure 2:
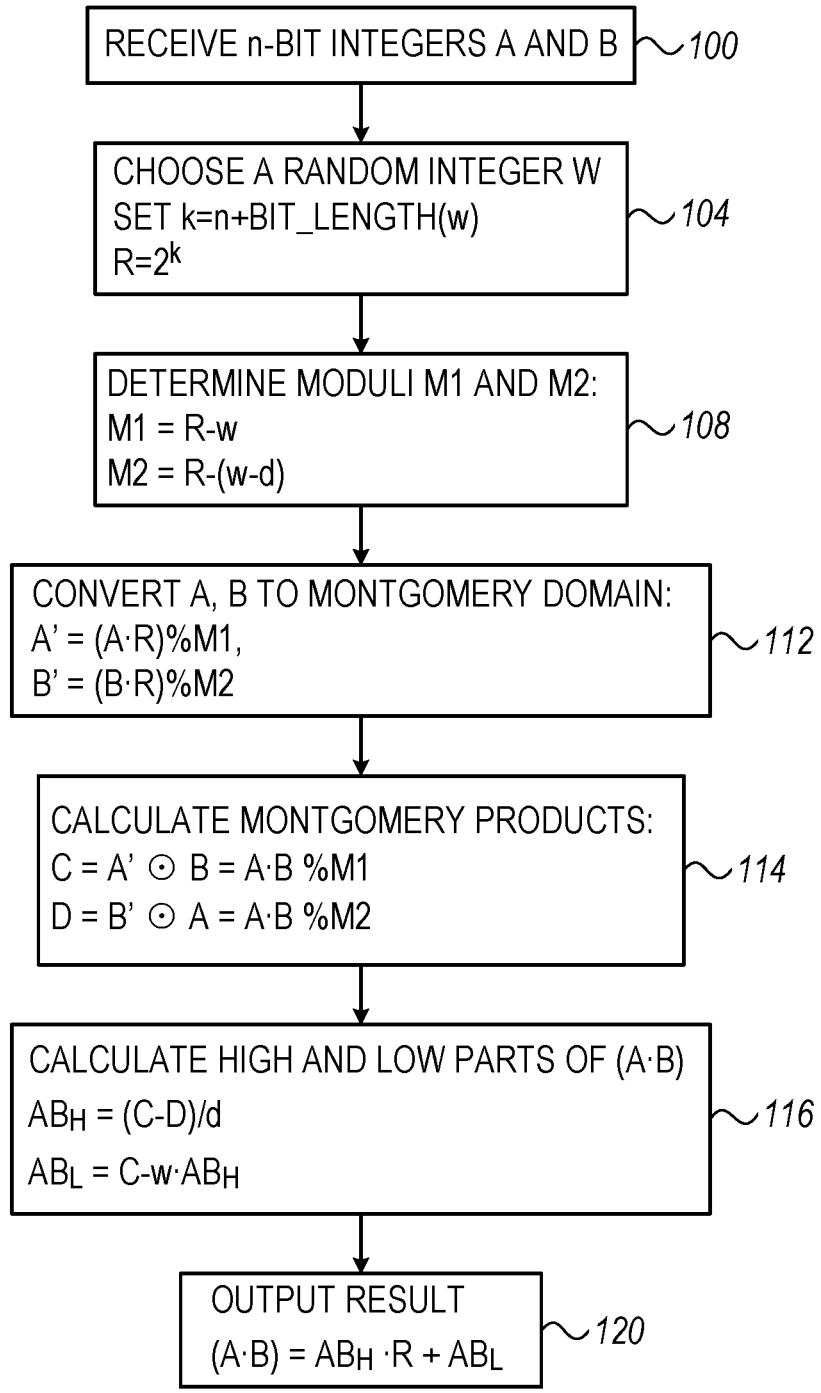
FIG. 2 is a flow chart that schematically illustrates a method for non-modular multiplication based on Montgomery nodular multiplications, in accordance with an embodiment that is described herein.

FIG. 2 is a flow chart that schematically illustrates a method for non-modular multiplication based on Montgomery modular multiplications, in accordance with an embodiment that is described herein. In the description that follows, the method is described as executed by non-modular multiplier 24 of FIG. 1.

The method begins with non-modular multiplier 24 receiving n-bit integer inputs A and B, at an input step 100. At a randomization step 104, the non-modular multiplier generates a random odd integer w (72), e.g., using random generator 76. Further at step 104, the non-modular multiplier sets integer k 48, which determines $R=2^k$. In an embodiment k is set to n plus the bit-length of w. For example, when w is a 32-bit integer, k=n+32. By selecting k as n plus the bit-length of w, the following conditions are fulfilled.

$$w*A < R$$

$$(w-d)*B < R \qquad \text{Equation 7:}$$

Note that in Equation 7, assuming both inputs A and B are n-bit integers, if the upper condition is true so is lower condition, and therefore only the upper condition should be considered in selecting R sufficiently large.

At a moduli selection step 108, the non-modular multiplier determines moduli M1 (64) and M2 (68) based on $R=2^k$ and random integer w, in accordance with Equation 6 above, i.e., M1=R−w, M2=R−(w−d). At a conversion step 112, Montgomery engine 40 converts A and B to Montgomery domain moduli M1 and M2, respectively, using converter 56. In calculating A', we partition R=(R−w)+w, and using the condition w*A<R of Equation 7, we get with high probability also w*A<(R−w) or:

$$A' = A*R \% M1 = w*A \% (R-w) = w*A \qquad \text{Equation 8:}$$

In Equation 8, the modulus by (R−w) operation is required only when w*A>(R−w), and can be omitted otherwise. Since we have w*A<R, the probability of w*A exceeding (R−w) is w/R, which for a 32-bit w and 512-bit k is smaller than $2^{32}/2^{512}$, which practically equals zero.

Similarly, in calculating B' we partition R=[R−(w−d)]+(w−d), and using the condition (w−d)*B<R of Equation 7, we get with high probability also (w−d)*B<[R−(w−d)] or:

$$B' = B*R \% M2 = (w-d)*B \% [R-(w-d)] = (w-d)*B \qquad \text{Equation 9:}$$

In some embodiments, the multiplications w*A and (w−d)*B in Equations 8 and 9, respectively, are carried out by arithmetic module 80.

In some embodiments, Montgomery engine 40 applies converter 56 separately for input A to produce A' and for input B to produce B'. The output of converter 56, i.e., A' or B' is delivered to operand 54A of Montgomery multiplier 52.

At a modular calculation step 114, Montgomery multiplier 52 calculates modular products as given in Equations 4 and 5 above:

$$C = A' \odot B = A*B \% M1 \qquad \text{Equation 10:}$$

$$D = B' \odot A = A*B \% 2M \qquad \text{Equation 11:}$$

In the appendix below, we present a method in which reducing a 2 m-bit integer Z using different moduli M1 and M2, is used for representing Z by m-bit low and high parts Z1 and Z0 that can be solved given Z % M1 and Z % M2. By applying the results of appendix to Z=(A*B) we can partition the non-modular product into high and low parts as will be described herein.

At a high/low partitioning step 116, the 2 n-bit product (A*B) is partitioned into high and low parts denoted $AB_H$ and $AB_L$, respectively, wherein $(A*B)=AB_H*R+AB_L$. Based on the appendix, we have:

$$AB_H = \frac{C-D}{d} \qquad \text{Equation 12}$$

$$AB_L = C - w*AB_H \qquad \text{Equation 13}$$

In Equations 12 and 13, $R=2^k$, $AB_L$ is a k-bit integer and $AB_H$ is a (2 n−k)-bit integer. In some embodiments, d is a power of 2, and dividing by d in Equation 12 is implemented efficiently as a binary shift operations. At an output step 120, non-modular multiplier 24 outputs the non-modular product (A*B) as:

$$(A*B)=AB_H*R+AB_L \qquad \text{Equation 14:}$$

and the method then terminates.

Multiplier 24 typically chooses a different value of w each time the method of FIG. 2 is invoked. As such, the temporal or spectral pattern of power consumption of multiplier 24, and of device 20 as a whole, varies randomly. The power consumption pattern is randomized even if the input values A and B remain the same. Therefore, a side-channel attack is unlikely to deduce any secret information, e.g., the values of A and B, from analysis of the power consumption profile.

The embodiments described above are given by way of example, and other suitable embodiments can also be used. For example, in the description above, Montgomery engine 40 comprises a single Montgomery multiplier and a single converter to Montgomery domain that are both applied twice for calculating the two modular products A*B % M1 and A*B % M2. In alternative embodiments, in which Montgomery engine comprises two Montgomery multipliers 52 and two converters 56, the two modular products are computed in parallel, which reduces the computation time by half.

APPENDIX

Let Z be a 2 m-bit integer. Z can be represented as Z=Z1*R+Z0, wherein a low part Z0 and a high part Z1 comprise m-bit integers, and $R=2^m$. Reducing the 2 m-bit integer Z by moduli M1=R−w and M2=R−(w−d), wherein w>d is an odd integer that is very small compared to R results in:

$$Z \% M1=(w*Z1+Z0) \% M1 \qquad \text{Equation 15:}$$

$$Z \% M2=[(w-d)*Z1+Z0] \% M2 \qquad \text{Equation 16:}$$

It can be shown that if the bit-length m is selected sufficiently large so that Z1<<M1, we have, with high probability, $$Z \% M1=w*Z1+Z0$$

$$Z \% M2=(w-d)*Z1+Z0$$

And then the following formulas produce the high and low parts of Z given Z % M1 and Z % M2:

$$Z1 = \frac{Z \% M1 - Z \% M2}{d} \qquad \text{Equation 17}$$

$$Z0 = Z \% M1 - w * \frac{Z \% M1 - Z \% M2}{d} \qquad \text{Equation 18}$$

As noted earlier, in an alternative embodiment of the present invention, the steps and operations described above are carried out by a suitable programmable processor under the control of software program instructions. The software may be downloaded to the processor in electronic form, for example over a network. Additionally or alternatively, the software may be stored on tangible, non-transitory computer-readable media, such as optical, magnetic, or electronic memory media.

Although the embodiments described herein mainly address an efficient non-modular multiplication operation that is protected against side-channel attacks, the methods and systems described herein can also be used in other applications, such as in implementing non-modular multiplication in software, in which case naïve multiplication may be faster but is not protected against DPA attacks.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A non-modular multiplier, comprising:
   an interface, which is configured to receive n-bit integers A and B; and
   circuitry, which is configured to calculate a non-modular product (A*B) by performing a sequence of computations, and to randomize a pattern of an electrical power consumed by the non-modular multiplier when performing the sequence, the sequence comprising:
   generating a random number w;
   determining moduli M1 and M2 that depend on a number $R=2^k$, wherein k equals a bit-length of M1 and M2, and on the random number w, and calculating a first modular product C=A*B % M1 and a second modular product D=A*B % M2; and
   producing and outputting the non-modular product (A*B) based on the first and second modular products,
   wherein the circuitry comprises a Montgomery multiplier, which is configured to calculate the first and second modular products.

2. The non-modular multiplier according to claim 1, wherein the circuitry is configured to convert A to A' in the modulus M1 of Montgomery domain by calculating w*A, to convert B to B' in the modulus M2 of Montgomery domain by calculating (w−d)*B, wherein d is an integer smaller than w, and to calculate the first and second modular products by calculating respective Montgomery products A'⊙B and A⊙B' using the Montgomery multiplier.

3. The non-modular multiplier according to claim 1, wherein (A*B) is represented as a combination of a low part $AB_L$ and a high part $AB_H$ satisfying $(A*B)=AB_H*R+AB_L$, and wherein the circuitry is configured to calculate $AB_H$ and $AB_L$ based on the first and second modular products.

4. The non-modular multiplier according to claim 3, wherein the circuity is configured to calculate the high part as $AB_H=(C-D)/d$, wherein d is an integer used in converting B to Montgomery domain, and to calculate the low part as $AB_L=C-w*AB_H$.

5. The non-modular multiplier according to claim 1, wherein the circuity is configured to determine modulus M1 as M1=R−w, and to determine modulus M2 as M2=R−(w−d), wherein d is an integer smaller than w.

6. A method for non-modular multiplication, comprising:
receiving n-bit integers A and B; and
using a multiplier, calculating a non-modular product (A*B) by performing a sequence of computations, and randomizing a pattern of an electrical power consumed by the multiplier when performing the sequence, the sequence comprising:
generating a random number w;
determining moduli M1 and M2 that depend on a number $R=2^k$, wherein k equals a bit-length of M1 and M2, and on the random number w, and calculating a first modular product C=A*B % M1 and a second modular product D=A*B % MM2; and
producing and outputting the non-modular product (A*B) based on the first and second modular products,
wherein calculating the first and second modular products comprises calculating the first and second modular products using a Montgomery multiplier.

7. The method for non-modular multiplication according to claim 6, wherein calculating the first and second modular products comprises converting A to A' in the modulus M1 of Montgomery domain by calculating w*A, converting B to B' in the modulus M2 of Montgomery domain by calculating (w−d)*B, wherein d is an integer smaller than w, and calculating the first and second modular products by calculating respective Montgomery products A'⊙B and A⊙B' using the Montgomery multiplier.

8. The method for non-modular multiplication according to claim 6, wherein (A*B) is represented as a combination of a low part $AB_L$ and a high part $AB_H$ satisfying $(A*B)=AB_H*R+AB_L$, and comprising calculating $AB_H$ and $AB_L$ based on the first and second modular products.

9. The method for non-modular multiplication according to claim 8, wherein calculating the high part comprises calculating $AB_H=(C-D)/d$, wherein d is an integer used in converting B to Montgomery domain, and wherein calculating the low part comprises calculating $AB_L=C-w*AB_H$.

10. The method for non-modular multiplication according to claim 6, wherein determining the moduli M1 and M2 comprises determining modulus M1 as M1=R−w, and determining modulus M2 as M2=R−(w−d), wherein d is an integer smaller than w.

11. A computational device, comprising:
an interface, which is configured to receive n-bit integers A and B; and
a multiplier, which is configured to calculate a non-modular product (A*B) by performing a sequence of computations, and randomizing a pattern of an electrical power consumed by the multiplier when performing the sequence, the sequence comprising:
generating a random number w;
determining moduli M1 and M2 that depend on a number $R=2^k$, wherein k equals a bit-length of M1 and M2, and on the random number w, and calculating a first modular product C=A*B % M1 and a second modular product D=A*B % M2; and
producing and outputting the non-modular product (A*B) based on the first and second modular products,
wherein the multiplier comprises a Montgomery multiplier, which is configured to calculate the first and second modular products.

12. The device according to claim 11, wherein the multiplier applies first and second non-modular multiplication operations between A and B, with different respective w values, wherein first and second power consumption patterns, corresponding to power consumed during executing the first and second non-modular multiplication operations, comprise different respective power consumption patterns.

* * * * *